Sept. 9, 1941. W. STROBRIDGE Re. 21,899

GARMENT PRESSING MACHINE

Original Filed March 19, 1936 3 Sheets-Sheet 1

Inventor
William Strobridge
By Dodge and Sons,
Attorneys

Sept. 9, 1941. W. STROBRIDGE Re. 21,899

GARMENT PRESSING MACHINE

Original Filed March 19, 1936 3 Sheets-Sheet 2

Inventor
William Strobridge
Edgar Bonn,
Attorneys

Sept. 9, 1941. W. STROBRIDGE Re. 21,899

GARMENT PRESSING MACHINE

Original Filed March 19, 1936 3 Sheets-Sheet 3

Inventor:
William Strobridge

By Dodge and Sons,

Attorneys

Reissued Sept. 9, 1941

Re. 21,899

UNITED STATES PATENT OFFICE 21,899

GARMENT PRESSING MACHINE

William Strobridge, Syracuse, N. Y., assignor to United States Hoffman Machinery Corporation, New York, N. Y., a corporation of Delaware Original No. 2,097,746, dated November 2, 1937, Serial No. 69,698, March 19, 1936. Application for reissue May 4, 1938, Serial No. 206,084

18 Claims. (Cl. 38—36)

This invention pertains to garment presses, and relates more particularly to the press closing mechanism and the means for locking such mechanism in operative pressing position, irrespective of the thickness of the material or garment being pressed.

A structure embodying my invention is shown in the annexed drawings, wherein:—

Figure 1:
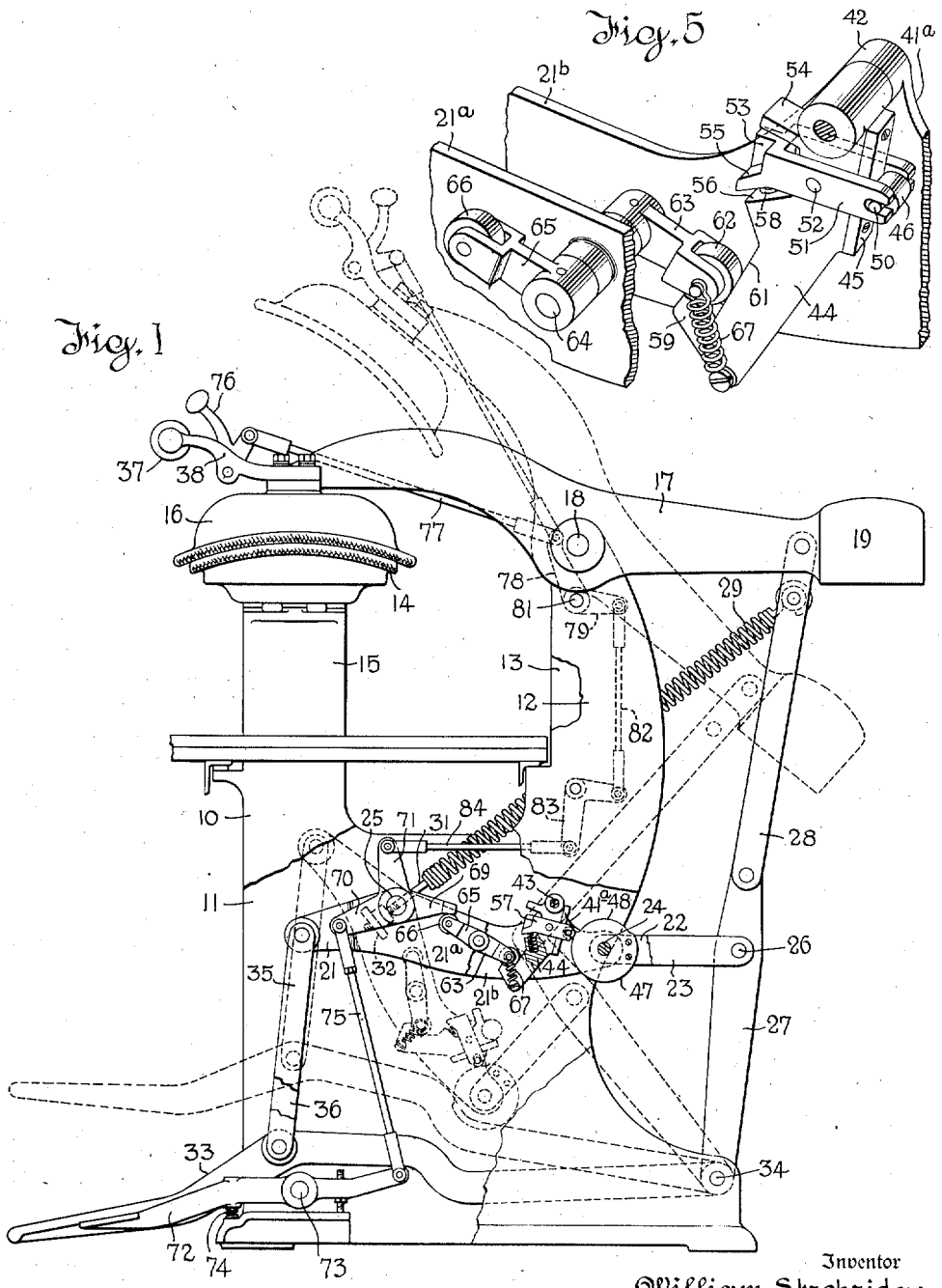
Figures 2, 4:
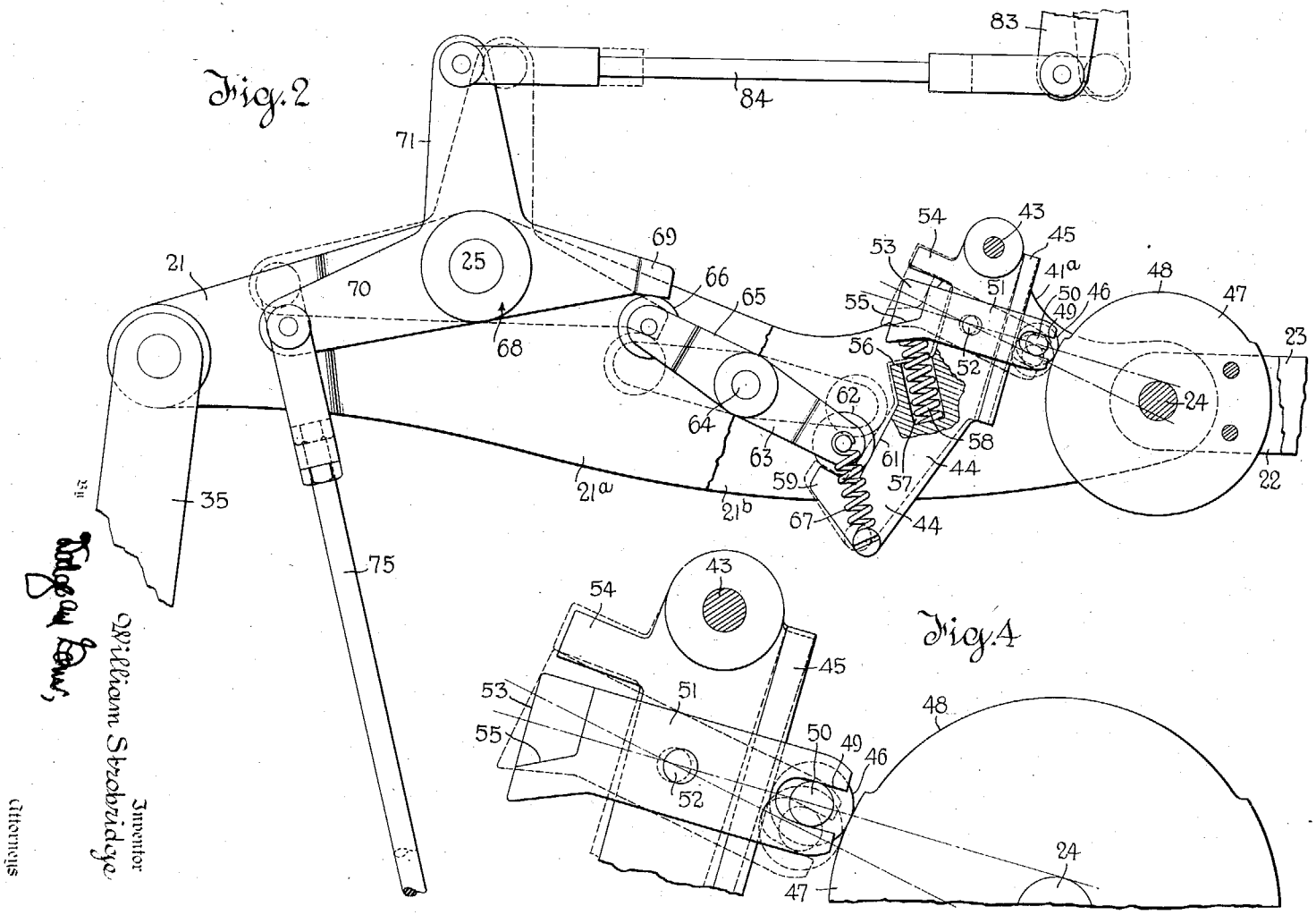
Figure 3:
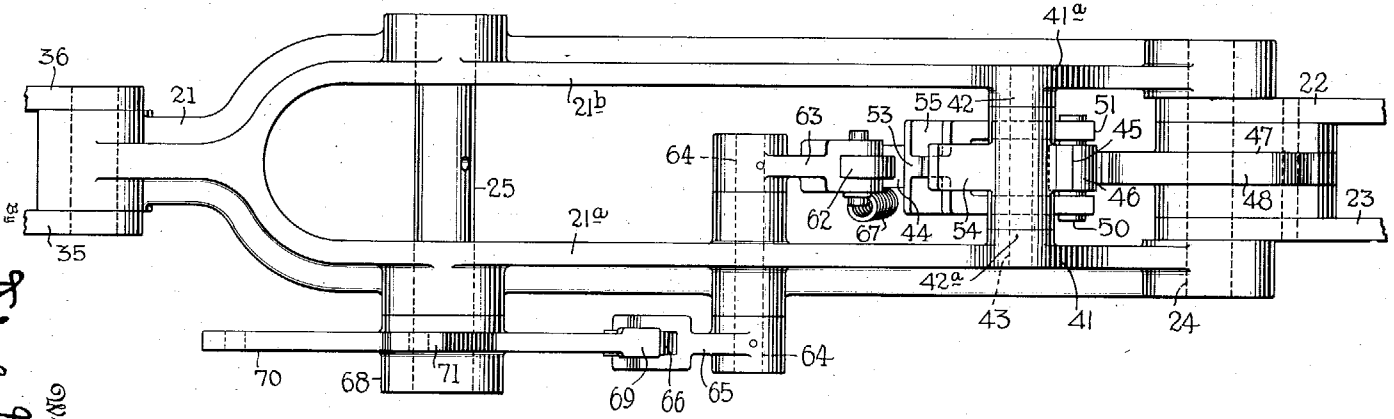

Figure 1 is a side elevation of a press with portions broken away and partly in section, the usual press head being shown in full lines in pressing relation with the buck and in dotted lines in fully opened position;

Fig. 2, a side elevation of a portion of the primary toggle and the automatic locking means therefor, partly in section, the dotted line position of said means indicating the release position of the same just prior to the movement of the toggle to press opening position;

Fig. 3, a top plan view of the forward link of the primary toggle hereinafter set forth in detail;

Fig. 4, a side elevation of the locking mechanism as shown in Fig. 2 and upon an enlarged scale; and Fig. 5, a perspective view of portions of the forwark link of the primary toggle and those elements of the locking mechanism which are carried thereby.

In the drawings, 10 and 11 denote the vertically disposed side elements which are suitably interconnected and go to make up the main frame of the machine. At its rear, the frame is formed with the usual upstanding elements 12 and 13, which are, as a matter of fact, extensions of the members 10 and 11.

The buck is denoted by 14 and is mounted upon the usual buck support 15. The press head 16 is secured to the forward end of the usual head carrying lever 17 pivoted at 18 to the upper ends of the frame members 12 and 13, said lever at its rear end being suitably counterweighted as at 19.

The construction above outlined is well known and the invention insofar as the press closing and locking means is concerned, is not to be limited to the utilization of such a press structure.

The primary toggle comprises a forward link or casting 21, the inner or rear portion whereof is bifurcated, producing two parallel elements 21[a] and 21[b], and the rear link of the toggle is shown as composed of two laterally spaced complemental members 22 and 23. The relationship of the links is best shown in Fig. 3, which, as above indicated, is a top plan view of the forward link and a portion of the rear elements which form the rear link.

The links of the toggle are pivotally connected as at 24 and the forward link 21 is pivotally mounted on a shaft 25 supported in the side frame members 10 and 11. The rear link of the primary toggle is pivotally connected at 26 to the lower link 27 of the secondary toggle, the upper link 28 whereof is pivotally connected to the rear portion of the head carrying lever 17. A spring 29 connected to the upper portion of the link 28 of the rear or secondary toggle extends downwardly and forwardly therefrom and is connected to a fixed portion of the machine. In the instant case, the connection is shown as a rod 31 extending through the shaft 25 and carrying an adjusting nut 32 at its lower end. This spring acting in conjunction with the counterweight tends to swing the head carrying lever to the dotted line position (Fig. 1), or in other words, to open the press, the head and lever 17 of which are virtually counterbalanced.

A lever 33 fulcrumed at 34 at the rear or lower portion of the frame is interconnected to the forward end of the link 21 of the primary toggle through links 35 and 36. By depressing the free end of the lever 33, the link 21 is turned counterclockwise upon the shaft 25 and acts to cause the primary toggle to approach a straightened position and in doing so causes the secondary toggle (27, 28) to likewise approach straightened position and to move the head carrying lever counterclockwise and force the head 16 down upon the buck 14. The parts are so proportioned and arranged that at no time does the primary toggle pass a straightened position or, as a matter of fact, assume a straightened position, the pivotal points lying below a line which passes between the pivotal points 24, 25 and 26.

As is usual with presses of this type, a handle as 37 is carried by a bracket 38 secured to the upper face of the head, and the operator by drawing down upon this handle may bring the press head into contact with the goods imposed upon the buck, or assist in the closing of the press when the operator presses his foot upon the pedal at the outer end of the lever 33.

Inasmuch as the toggles do not assume a straightened position or pass a line which is coincident with the centers of connection between the various links and the pivotal points thereof, it becomes necessary to provide some locking means to hold the press in its closed position. The structure about to be described not only locks the press in its closed position but insures the locking of the press head in connection with goods of various thicknesses.

Each of the members 21[a] and 21[b] of the forward link of the primary toggle, has formed thereon adjacent its rear or innermost end and upon its upper edge, an upstanding member or projection. Said projections are denoted by 41 and 41[a], respectively, (see Fig. 3), and extending from the inner face of each is a hub-like member denoted by 42, 42[a], respectively. Mounted within the hub-like members is a pivot pin or shaft 43 upon which latter is mounted for swinging movement a downwardly extending arm denoted generally by 44. Said arm or member 44 at the upper portion thereof has attached to it a bearing plate 45 produced from relatively hard metal, to afford a non-wearing surface. The member 45 is designed to function with a roller 46, the roller likewise bearing against a cam 47 secured to and movable with the rear link of the toggle, or the members 22 and 23.

As will be seen upon reference to the drawings, the outer edge of the cam 47 is relieved throughout a portion of its periphery as at 48 so that when the press is opened through the breaking of the toggles and the parts come to the dotted line position in Fig. 1, the roller does not exert any binding action between the member 45 and the face of the cam 47. The roller 46 is provided with pintles 50 at its ends which extend into elongated slots 49 formed in one end of a U-shaped rocker or carrier 51, pivoted at 52 to the pendulous member 44.

The closed end of this substantially U- or clevis-shaped member 51 is provided with an outward projection or stop element 53 designed under certain conditions or position of the parts, to coact with a similar member 54 formed as an extension of the member 44. In other words, the member 54 may be said to be the upper portion of a U-shaped opening formed in the forward upstanding edge of the member 44 which receives the closed end of the member 51.

The under face of the member 51 at its closed end and below the rib-like stop element 53 is formed with a bearing element or plate 55 which stands at a slight angle to the longitudinal axis of the member 51. Said plate lies opposite a projecting face 56 formed upon the member 44, as best shown in Fig. 2. This portion of said member 44 is provided with a socket or recess 57 and a coil compression spring 58 is seated in said opening or recess. The upper end of the spring bears against the under face of the projection or element 55 and acts at all times to rock the member 51 in a clockwise direction about the shaft or pivot 52, and thus throw the inner end of the lever downwardly.

Member 44 at its lower end is provided with an upwardly inclined hook-shaped element or stop member 59 which extends toward the front of the machine. The upwardly extending face 61 of the member 44 above the hook or stop 59 is flat and is designed to form a bearing face with which coacts a roller 62, said roller being carried at the outer end of an arm or lever 63 (see Fig. 5), which, in turn, is pinned or otherwise secured to a shaft 64 extending through hubs formed upon the opposite side faces of the element 21[a] of the bifurcated forward link of the primary toggle.

A second arm or lever 65 is secured to the shaft 64 and extends in a direction opposite to the lever 63. It also carries a roller denoted by 66. Normally, the shaft 64 is rocked clockwise through the action of a spring 67 attached to the lower end of the arm 44 and to the lever 63, as by attaching it to the pin associated with the roller 62. This has the effect of carrying the roller 66 upwardly or, in other words, acts to rock the shaft 64 in a clockwise direction.

The roller 66 is thus normally held against one arm of a three-armed lever denoted generally by 68 mounted for rocking movement upon the shaft 25. The arm with which the roller 66 contacts is denoted by 69 and the other two arms are denoted respectively by 70 and 71, the latter (see more particularly Fig. 2), extending upwardly at substantially right angles to the other two arms.

This three-armed lever 68 is designed to release the lock upon depression of a foot lever 72 which is pivoted at 73 upon the bed of the machine and the forward end of which is normally thrown upwardly by a spring 74 interposed between the forward portion of the lever and the base of the machine. At its rear end, the lever has connected thereto a link or thrust rod 75 which, in turn, is connected to the outer end of the arm 70 of the lever 68. Lever 72 may be termed the foot release pedal or lever. It is possible, however, to actuate the three-armed lever 68 to release the locking mechanism by hand, and this is effectuated through the actuation of a lever 76 fulcrumed upon the bracket 33 and interconnected with the upstanding arm 71 of the lever 68 in the following manner: A rod or link 77 extends rearwardly from the lever 76, said link being connected to a lever 78 secured to a rocker shaft 81 which also has attached to it a second arm or lever 79 to which latter is connected a link 82 connected in turn to a bell crank 83 from which extends a link 84 pivotally attached to the upper end of arm 71.

The parts are so proportioned and arranged that there is a convergent relation between the bearing face of the member 45 and the face of the cam 47. The structure contemplates an angle of approximately 9° between said bearing face and a tangent drawn at the face of the cam at the point of contact with the locking roller 46. This condition, it will be realized, always obtains even though the effective portion of the cam is truly circular.

When the head of the press is moved to closed position either through operation of the foot lever 33 or by drawing the head down by the handle 37, the parts will move from the dotted line position (Fig. 1) toward the full line position thereof. In so doing, they will reach a point where the roller 46 will move into contact with the active or circular portion of the cam 47 and when this position obtains, the press will remain locked and the toggles held against retrograde movement. The spring 58 tends at all times to rock the member 51 clockwise, so as to carry the roller 46 downwardly and into contact with the cam.

Irrespective of the thickness of the goods, the press will remain closed so long as the roller and cam are in contact, for the roller, as above noted, acts as a wedge between the cam and the plate 45. When, however, the three-armed lever 68 is rocked so as to depress the arm 69 thereof and to rock the lever structure 65, 63, the roller 62 will move upwardly along the face of the member 44 and out of contact with the restraining or limiting hook-shaped member 59, permitting the member 44 to swing clockwise to a slight extent from the position shown in full lines in Figs. 2 and 4, to the dotted line position in said figures, thereby relieving the roller from wedging relation with reference to the cam and the bearing plate.

When this position of the locking mechanism obtains, the press head will be moved upwardly through the action of the main spring 29, and little or no noise obtains, such as is commonly present in many presses utilizing a toggle mechanism for applying pressure thereto, this primarily for the reason that the toggles have not been carried to or past their center line and, furthermore, due to the fact that the links move with ease and without coming into contact with any portion of the machine throughout their opening and closing movement.

From the foregoing, it will be appreciated that the roller 46 produces a wedging action between the cam and the bearing or wearing plate 45. At the same time, so long as the roller 62 is held down against the hook 59 or in its lowermost position, the member 44 is precluded from swinging clockwise about its pivot 43, hence the locking roller 46 is held in place with reference to the cooperating cam 47. The lever 63, the roller 62 and the cooperating elements might be said to form a lock for the lock, the latter comprising the cam 47, roller 46 and allied parts.

The stop 54, heretofore referred to, acts to prevent the clevis member 51 from being thrown upwardly by the spring 58 to such an extent as to possibly free the pintles of the roller 46 from the slots in the outer end of the clevis 51. The cam 47 is shown as substantially circular in outline except for its relieved portion, which, however, is only relieved to such an extent as to admit of release of the locking function of the roller and the plate 45, while still preventing the pintles of the roller from moving out of the slots in the clevis. Such a form is simpler to make and adds to its stability of structure. The cam, of course, might be so formed as to present only the necessary active portion and the necessary depressed portion to bring about the functions just specified.

As above noted, the press head may be released either by foot or by hand, and the one is independent of the other. It will be found, however, that the hand or finger release control will be employed by the operator in preference to the foot release; in fact the former is utilized generally to the exclusion of the other once the press operator becomes accustomed thereto. This is due primarily to the fact that the operator's hand, or hands, are normally on the handle 37 as the head 16 is swung downwardly to press closing position and locked. The operator usually maintains such position of the hands or hand unless a relatively long period of pressure is to be had and, consequently, he may by merely depressing the lever 76 by a finger release the lock, thus permitting the head to swing upwardly. Such "finger tip release" as it is known, does not necessitate the removal of the operator's hand from the handle 37 so that he may pull the head downwardly to facilitate quick closing of the press or partial closing to effect a "patting" operation. This facility and ease of operation leads to increased production which, of course, is a material factor, particularly so to the press operator when working upon a piece basis.

Again, the "finger tip" release makes for reduction of fatigue in that the operator is not thrown off balance which latter condition obtains when he raises one foot from the floor to place it upon the lock release pedal 72. Absence of fatigue also lends itself to the factor of increased production.

Furthermore, this "finger-tip" release permits the operator to readily pat the goods without the necessity of employing a treadle release, which is common in most presses of today. This "patting" operation, as it is well known to those skilled in the art, involves bringing the press head one or more times into contact with the goods to be pressed, without exerting the full degree of pressure utilized in the final pressing operation. By this method the material can be more or less plasticized and made ready for the final pressing operation. An obstinate wrinkle, for example, might remain in the pressed garment were it not for this preliminary patting operation. When the operator desires to perform this operation, he does not wish to lock the press in its closed position, but desires a partial opening of the head so that he may view the garment and decide whether the character of the previous work performed justifies the final pressing operation, or whether an additional steaming and patting should obtain before executing the final pressing. The patting operation is performed with machines utilizing the present invention quite rapidly, so as not to lose too much time and it is, therefore, very advantageous that the pressing machine be so constructed that the patting may be performed conveniently and with the least physical effort.

It is also to be noted that the lock releasing means are not connected to the locking means mounted upon and coacting with the links of the toggle, and are in contact with same only when the press head is in pressure applying position.

What is claimed is:

1. In a garment press, the combination of two relatively movable pressing elements; toggle mechanism for moving at least one of said elements to effectuate a pressing operation with the other; and a lock mounted upon and coacting with at least one pair of links of said toggle mechanism to lock the same when the movable pressing element has been brought into pressing position with reference to the other pressing element.

2. In a garment press, the combination of a frame; a buck mounted thereon; a head; a head carrying lever pivotally mounted on the frame; a toggle interposed between the rear portion of the lever and a fixed portion of the frame; a primary toggle connected to said first named toggle and likewise pivotally attached at its forward portion to the frame; operator operated means for moving said primary toggle toward straightened position; and locking means mounted upon and coacting with the links of said primary toggle to lock the same when the head is brought to pressing position.

3. A press as set forth in claim 2, wherein means is provided for moving the locking means to inactive position to release the press.

4. In a garment press, the combination of a frame; a buck mounted thereon; a head; a head carrying lever pivotally mounted on the frame; a handle carried by the head within easy reach of the hand of the press operator and by which the head may be manually raised and lowered; a toggle interposed between the rear portion of the lever and a fixed portion of the frame; a primary toggle connected to said first named toggle and likewise pivotally attached at its forward portion to the frame; operator operated means for moving said primary toggle toward straightened position; locking means mounted upon and coacting with the links of said primary toggle to lock the same when the head is brought to final pressing position; a foot lever for releasing the lock; and manually operable means carried by the head adjacent the handle for likewise releasing the lock and holding it out of operation, whereby the lock may be released either through foot or hand operation, and a patting operation effected by the head when the manually operable lock releasing means is maintained in its operated position.

5. In a garment press, the combination of a frame; a buck mounted thereon; a head; a head carrying lever pivotally mounted on the frame; a toggle interposed between the rear portion of the lever and a fixed portion of the frame; a second toggle connected to the first toggle and pivotally mounted upon the frame; operator operated means for moving said second toggle toward straightened position; and locking means for said second toggle comprising a cam carried by and fixed to one of the links of said second toggle, a swinging support mounted upon the other of the links of said second toggle and movable toward and from said cam, a roller normally resting against the cam, a carrier for said roller, said carrier being pivotally mounted upon the swinging support, and spring means bearing upon said carrier and serving to rock the same in a direction to carry the roller into the space between the cam and the adjacent face of the swinging support and to establish wedging relation with reference to said parts upon movement of the second toggle toward straightened position.

6. In a garment press, the combination of two relatively movable cooperating pressing elements; toggle mechanism for moving at least one of said elements to effect a pressing operation with the other; and a lock mounted upon and coacting with at least one pair of the links of said toggle mechanism to lock the same when the movable pressing element is brought into pressing position with reference to the other pressing element, said lock comprising a cam secured to and movable with one of the links aforesaid, an element mounted upon the adjacent link for swinging movement toward and from the cam, a roller interposed between said element and the cam, a carrier for the roller pivoted to said swinging element, and a spring interposed between said swinging element and the pivotal support for the roller, said spring acting to rock said roller support in such direction as to move the roller inwardly between and into locking contact with the cam and the adjacent face of the swinging element as the toggle links approach straightened position.

7. A garment press as set forth in claim 6, wherein the swinging element is provided with a bearing face adjacent its lower end remote from the cam and from which extends outwardly a hook-shaped or stop element; a lever pivoted to the link upon which the swinging member is mounted; a roller carried by said lever and coacting with the bearing face and the hook-shaped member; a spring interconnecting the outer end of the lever and the lower portion of the swinging member; and means under the control of the operator for rocking said lever.

8. A lock for a press closing toggle, comprising two pivotally connected toggle links; means for moving said links toward straightened pressure applying position; a cam secured to one of said links at the pivotal connection of said links; a member pivoted at its upper end upon the opposite link and swingable toward and from said cam; a roller interposed between said member and the cam; a rocking support for said roller pivotally connected to the swinging member; a spring interposed between said pivoted, swingable member and the rocking support for the roller, said spring bearing upon the end of the support opposite that which supports the roller and tending normally to carry the roller inwardly between the cam and the adjacent face of the swingable member; a hook-shaped member formed upon the lower end of said swinging member and upon that side remote from the cam, said hook-shaped member merging into an upwardly extending face formed upon the swinging member, said face inclining toward the pivot of the swinging member; a roller coacting with said face and hook; a spring serving to draw the roller and swinging member into contact with the roller normally resting upon the hook-shaped member; a rocking support for said roller; and means under the control of the operator for rocking said support, and placing the last named spring under tension, thereby allowing the roller to move upwardly along the inclined face aforesaid, whereby the swinging member will be swung outwardly away from the cam and the roller which coacts therewith be released from its locking relation.

9. In a garment press, the combination of two relatively movable cooperating pressing elements; a primary toggle; a secondary toggle connected thereto and actuated thereby; means for moving the primary toggle toward straightened position and to thereby actuate the second toggle to effectuate pressing relation between the pressing elements; a lock for the primary toggle when the same is moved toward straightened position, said lock comprising a cam secured to one of the links of said primary toggle adjacent their pivotal connection, a member mounted upon the other link of the primary toggle for swinging movement toward and from said cam, means carried by said swinging member and cooperating with the cam to normally lock the links in their adjusted position, means acting at all times upon said last named means tending to effectuate such locking operation, and means normally holding the parts in such position.

10. A structure as set forth in claim 9, wherein the last named means may be moved to release the lock.

11. In a garment press, the combination of cooperating relatively movable pressing members; toggles for effectuating said movement; locking means for at least one of said toggles attached to and carried thereby to hold the toggles in pressure applying position; a lock holding said locking means in its locking position; and means under the control of the operator for releasing the lock.

12. In a garment pressing machine, the combination of a frame; a buck mounted thereon; a head cooperating with the buck; a lever pivoted to the frame and to one end of which the head is attached; a toggle interposed between the opposite end of the lever and a fixed portion of the structure; a primary power applying toggle connected to one of the links of the first named toggle and likewise pivoted to a fixed portion of the frame; a cam secured to one of the links of the primary toggle adjacent its connection with the other link thereof; a member having a bearing surface standing in convergent relation with the cam, said member being pivotally mounted at its upper end upon said second link adjacent its pivotal connection; a roller interposed between the cam and said bearing surface; a carrier for said roller pivotally mounted upon the pivoted member; a spring interposed between the rear end of the carrier and the swinging member, said spring serving to rock said carrier and to throw the roller aforesaid between the cam and the adjacent bearing surface of the swinging member, said swinging member having a bearing face formed upon its lower portion remote from that side with which the roller aforesaid coacts; a hook extending outwardly from said swinging member at the lower portion of said bearing face; a roller mounted for movement over said face; a lever carrying said roller; a spring interconnecting said lever and the swinging member and acting to draw the roller and swinging member into contact with each other; and means for rocking the lever in opposition to the action of the spring.

13. In a garment press, the combination of cooperating relatively movable pressing members; toggles for effectuating said movement; locking means acting through at least one of said toggles to hold the toggles in pressure applying position; a lock holding said locking means in locking position; and means under the control of the operator for releasing the lock.

14. In a garment press, the combination of cooperating relatively movable pressing members; toggles for effectuating said movement; locking means acting through at least one of said toggles to hold the toggles in final pressure applyin position; a lock holding said locking means in locking position; and means under the control of the operator for releasing the lock and maintaining it in such position, said means comprising a lever mounted upon the movable pressing element in position where it may be readily operated by the hand of the operator.

15. In a garment press, the combination of a frame; a buck mounted thereon; a head; a head carrying lever pivotally mounted on the frame; spring means acting to swing the lever to press open position; a handle movable with the head within easy reach of the press operator and by which the head may be manually lowered; toggle means interposed between the rear portion of the lever and a fixed portion of the frame to effect the final pressing operation between the head and buck; operator operated means for moving the toggle means toward and into pressure applying position; locking means coacting with the toggle means to hold the head in pressing position with reference to the buck; and releasing means for said locking means embodying a lever movable with the head, the free end whereof terminates adjacent the handle aforesaid, and connections intermediate said lever and the toggle locking means for releasing the latter, whereby the operator may while grasping the handle depress said lever by his finger and thus release the locking means, permitting the head to be lowered manually to effect a patting operation.

16. In a garment press, the combination of a frame; a buck mounted thereon; a head; a head carrying lever pivotally mounted on the frame; spring means acting to rock the lever to press open position; a handle carried by the head within easy reach of the press operator and through which the head may be manually lowered; toggle mechanism interposed between the rear portion of the lever and a fixed portion of the frame; operator operated means for actuating the toggle mechanism to effectuate a rocking movement of the lever toward press closed position; locking means for the press cooperating with the toggle mechanism when the same is brought to its press closing position; and manually operable lock releasing means carried by the head, said lock releasing means being located within reach of a finger of the operator's hand while grasping the handle aforesaid, said manually operable means serving when actuated to release the toggle lock and hold the same from functioning whereby the head may be manually and repeatedly brought into pressing position with the locking means held in its released position.

17. In a garment press, the combination of cooperating relatively movable pressing members comprising a fixed buck and a movable head; toggle mechanism for effectuating said movement; locking means for said mechanism to hold the head in pressure applying position; and means under selective control of the operator by hand or foot to release said locking means, said means comprising a foot pedal at the base of the press, a hand lever on the movable head, and linkage connecting both the pedal and hand lever to the lock releasing means to operate said releasing means selectively.

18. In a garment press the combination of cooperating relatively movable pressing members comprising a fixed buck, and a movable head having handle means thereon; toggle mechanism for effecting relative movement of said pressing members; locking means for said mechanism to hold the head in pressure applying position; and means under selective control of the operator by hand or foot to release said locking means, said means comprising a foot pedal at the base of the press, a hand lever on the movable head adjacent said handle means, to permit actuation of the lever by a hand on said handle means, and linkage connecting both the pedal and hand lever to the lock releasing means to operate said releasing means selectively.

WILLIAM STROBRIDGE.